Patented July 1, 1930

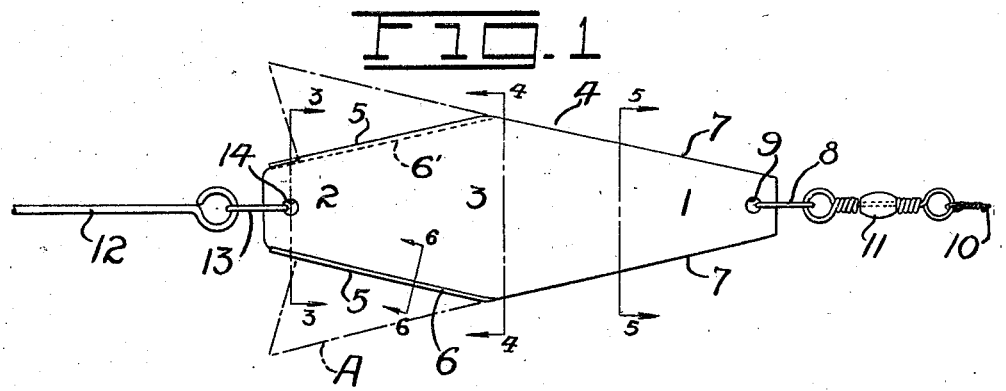
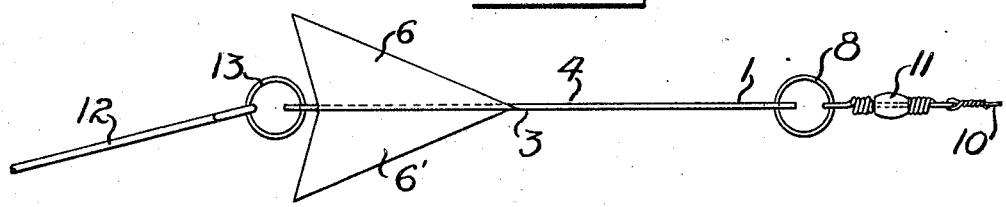
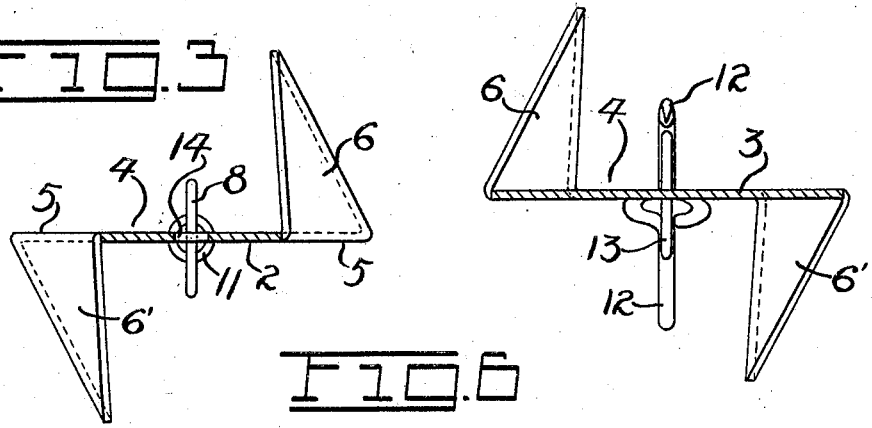
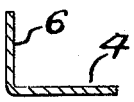
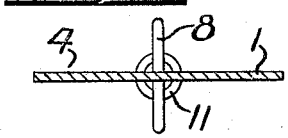

1,769,083

UNITED STATES PATENT OFFICE

GREY H. TOZIER, OF SEATTLE, WASHINGTON, ASSIGNOR TO TROLLING SUPPLY COMPANY, OF SEATTLE, WASHINGTON, A CORPORATION OF WASHINGTON

FISHING SPOON

Application filed April 16, 1928. Serial No. 270,359.

My invention relates to fishing spoons, and is particularly intended as a spoon for pleasure or commercial use in trolling for salmon and like large fish.

Salmon, and like fish, feed upon smaller fish, such as herring and candle fish. Such fish, especially when attacked, gather in schools, swimming rapidly, propelling themselves chiefly by sweeping or wriggling their tails back and forth, though keeping their body headed in the direction in which they wish to go. Their course through the water is evidenced by light flashing from their sides and tails. It is an object of my invention to provide a spoon which, as closely as possible, simulates the movement, or at least the flashing effect, of one or of several such fish.

While it is impossible to understand the psychology of the salmon, it is possible to state, as a matter of observation, that they are attracted by flashing objects, which attract presumably by their simulation of the fish upon which the larger fish feed. If this be the case, the greater, or the more attractive or lifelike the flash given off by such spoons, the more effective they will be in attracting and catching the larger fish. As has been noted, such fish propel themselves largely by sweeping their tails back and forth, and this tail presents a flash each time it is changed in position, hence, if the theory of salmon psychology expressed above is correct, a spoon which simulates this recurring flash of the tail, while maintaining the flash corresponding to the body portion in advance of the flashing tail portion, will prove attractive to the salmon. Or, following the theory further, a spoon which will simulate two or three such fish gathering together in a school, as is their wont when attacked, will prove attractive. It is my object, therefore, to provide a spoon which will thus simulate the movements of one of the small fish, or of several, according to the way the salmon looks at it, and which will thereby prove attractive to the salmon.

Still a further object is the provision of a construction of spoon which, while effective in the manner indicated, is simple to manufacture.

A further object is the provision of such a spoon in which the various surfaces are so arranged as to produce not only flashes from the individual surfaces, but flashes by reflection from other adjacent surfaces, thus producing a multiplication of flashes, and especially a spoon in which the flashes occur from plane surfaces rather than from curved surfaces, inasmuch as the plane surfaces, exposing large areas at a given angle of incidence to light beams, will reflect from the entire surface at once, whereas curved surfaces, presenting only small areas or lines at a given angle of incidence to the light beam, will reflect only a moving line of flashes, rather than a surface.

With these and other objects in mind my invention comprises the novel spoon and the novel arrangement of the parts thereof, as shown in the accompanying drawings, described in the specification, and more particularly defined by the claims terminating the same.

In the accompanying drawings I have shown my invention in a form which is now preferred by me, it being understood that various alterations in the shape, size and proportion of the parts, and in their relative arrangement, may be made without departing from the spirit of my invention, as defined by the appended claims.

Figure 1 is an elevation of my spoon, looking toward the body portion.

Figure 2 is an elevation in edge view of the same spoon.

Figure 3 is a transverse section through the spoon on the line 3—3 of Figure 1, and Figures 4, 5 and 6, are similar transverse sections on the respective lines 4—4, 5—5 and 6—6 of Figure 1.

My spoon may be formed very simply from a sheet of polished metal. Thus, as is shown in Figure 1, it may be formed of a blank which is substantially triangular in outline, the outline before folding being indicated by the dot and dash line A; the head end of the spoon is shown at 1, and the tail end at 2; these two ends and the intermediate portion 3 forming the continuous plane body portion of the spoon, indicated in general by the reference numeral 4. Now by bending the opposite angles at the rear portion 2 of the blank, along the lines 5, which in the finished spoon, define the converging side edges of the rear portion 2, there are formed the tail portions 6 and 6'. These portions 6 and 6' are turned one upwardly and the other downwardly, that is to say, in opposite directions, and they converge slightly to the rear, just enough to permit them to exert a propeller action to cause the spoon to spin at moderate speed when drawn through the water in trolling. They are, as nearly as possible, in parallel planes, though projecting from opposite faces of the spoon. Each of these tail portions 6 and 6' is plane, and while the angle of each, with respect to the body portion 4, may be any that is found suitable, in general it will be found that they operate best when substantially at right angles to the plane of the body portion. Each one of these portions 6 and 6' is triangular, with acute angle forward. When completed the spoon is somewhat lozenge shaped in outline, with rearwardly diverging edges 7 at its forward portion 1, and with converging edges 5 for its rear portion 2, the central portion 3 being of the greatest width.

Means are provided for attaching a line to the forward end 1 of the spoon, and as illustrated herein, a ring 8 is received in a small aperture 9 in the forward end 1 of the spoon, and through this ring 8 a line or leader 10 is connected to the spoon through a swivel 11. The precise means of attachment of the line are, of course, wholly immaterial. At the rear end of the spoon a hook 12 is secured directly to the spoon, or through the medium of a ring 13 received in an aperture 14 in the rear end 2 of the spoon. By this means the draft on the hook 12 is wholly through the spoon itself, though it might, in some instances, be found acceptable to provide a pivot spindle about which the spoon may rotate. However, in view of the fact that the multiplication of bearings which would be entailed by such a construction would multiply the chances for corrosion, and thus would render difficult the continued successful operation of the spoon, I prefer that the draft be entirely through the spoon itself.

Such a spoon, when drawn through the water, is caused to rotate by the impingement of water upon the tail portions 6 and 6'. It is only for this purpose that the planes of the tail portions 6 and 6' converge, and their convergence need only be so much as will produce the rotation of the spoon at the desired rate when being towed. Furthermore, the less these tail portions depart from planes parallel to the spoon's axis, the less compression and vacuum areas will be developed before and behind the spoon, tending to obscure and distort its flashes. Now, as the spoon is drawn through the water, rotating on its longitudinal axis through the holes 9 and 14, the light reflected directly from the body portion 1 conveys the impression of a small fish swimming forward. The flashes from the tail portions 6 and 6', however, appear to come alternately from one side of this body portion and then from the other. One conception of this effect is of the tail of a small fish being flashed rapidly from side to side as occurs when such a fish is propelling itself forward. Another conception of this effect is that of two smaller fish crowding toward a larger fish; all of these effects are heightened because of the reflection of light from the tail portion 6 onto the body portion 4 and vice versa, and thence to the eye of the observer, which normally would be the fish. It is this recurrence of broad flashes, particularly towards the tail end, where the hook is attached, which appears to attract the fish, but whatever may be the cause, actual experience with the spoon has shown that it is highly effective in attracting fish and in catching and holding them.

The body portion 4 gives two flashes with each rotation, one for each face, but at the tail there are six different plane surfaces in a given direction with each rotation, and six flashes of light are given off. If, as one theory goes, it is the recurrence of light flashes which is attractive to the fish, these six flashes will encourage the fish to strike towards the tail end. In any event, experience with this spoon has shown that the fish prefer it over other commercial spoons, and that when they strike they are hooked properly.

It will be observed that the corners of the forward end of the spoon are not rounded, but are left sharp. The purpose of this is to avoid too much of a stream-like effect, and to prevent too rapid spinning of the spoon, although this may largely be governed by the angle of the tail portions 6 and 6' relative to the spoon's axis.

What I claim as my invention is:—

1. A fishing spoon of sheet metal comprising a plane body portion tapering from a central portion towards both its head and tail ends, and two oppositely directed plane tail portions upstanding along its opposite side edges at its rear end, said tail portions being substantially triangular in shape, with an acute angle forward.

2. A fishing spoon of sheet metal, and comprising a substantially lozenge-shaped plane body portion, and two plane tail portions upstanding along its opposite side edges at its rear end, bent at right angles to the plane of the body portion, and projecting from opposite faces thereof and the upper edges of said tail portions, prior to bending, lying substantially in a continuation of the edges of the forward end of the body portion.

Signed at Seattle, King County, Washington this 24th day of March, 1928.

GREY H. TOZIER.